United States Patent [19]

Tsai

[11] Patent Number: 5,452,175
[45] Date of Patent: Sep. 19, 1995

[54] CONSTRUCTION OF A PANEL

[76] Inventor: Pei-Lien Tsai, No. 32, Lane 111, Sec. 2, Changhsin Rd., Homei Chen, Changhua Hsien, Taiwan

[21] Appl. No.: 335,244

[22] Filed: Nov. 7, 1994

[51] Int. Cl.⁶ .............................................. H02B 1/04
[52] U.S. Cl. ...................................... 361/643; 174/51;
200/296; 200/297; 248/27.1; 361/601; 361/631;
361/826; 439/43; 439/110; 439/536
[58] Field of Search ...................... 174/51, 53; 200/296,
200/297, 305; 248/27.1, 27.3; 361/601,
627–631, 642–647, 799, 826; 439/43, 53, 94,
110, 119, 120, 535, 536, 538

[56] References Cited

U.S. PATENT DOCUMENTS 4,295,018 10/1981 Borrelli ............................... 200/297

*Primary Examiner*—Gregory D. Thompson
*Attorney, Agent, or Firm*—Poms, Smith, Lande & Rose

[57] ABSTRACT

A construction of a panel includes at least one opening defined therein, a first and a second box are respectively disposed beside the opening of the panel, each of the first and second boxes has a hole defined therein and an extending live line and an extending ground line respectively extend from the first box and the second box and extend along sides defining the opening, one end of the extending live/ground line is in communication with the corresponding holes of the first and the second boxes. The extending live and extending ground lines are respectively and electrically connected to an electrical element disposed in the panel, which has two conductive plates extending therefrom, each of the conductive plates has an L-shaped plate extending transversely therefrom so as to receive the extending live/ground lines between the L-shaped plate and the conductive plate.

2 Claims, 4 Drawing Sheets

CONSTRUCTION OF A PANEL

BACKGROUND OF THE INVENTION

The present invention relates to a construction of a panel to which switches or sockets are engaged. The panel has an extending live line and an extending ground line each of which extends along a configuration of an opening of the panel for the switches and the sockets contacting thereto when the switches and the sockets are installed within the opening.

Referring to FIGS. 1 and 2, a conventional electrical panel 10 is fixed on a wall from which a live line 11 and a ground line 12 extend in advance, the panel 10 has an engaging means (figures not shown) formed therein by which a switch 13 and a socket 14 are able to be fixedly engaged thereto and a cover 15 which has a hole defined therein and corresponding to the switch 13 and the socket 14 engaged to the panel 10 such that only the switch 13 and the socket 14 are shown on the cover 15. Each switch 13 and socket 14 has two upper and lower holes 131/141 defined in a back thereof. The adjacent upper and the lower holes 131/141 of the adjacent switch 13 and socket 14 and/or the adjacent socket 14 are electrically connected by inserting a U-shaped wire 15 therein, i.e. one leg of the U-shaped wire 15 is inserted in the upper/lower hole 131 of the switch 13 and the other leg of the U-shaped wire 15 is inserted in the upper/lower hole 141 of the socket 14, the live line 11 is connected to one of the upper holes 131/141 and the ground line 12 is connected to one of the lower holes 131/141 so as to electrically connect the switch 13 and the socket 14.

Therefore, a problem arises because an electrician has to take time to make a lot of the U-shaped wires 15 to electrically connect the switch 13 and the socket 14, the U-shaped wire 15 sometime is difficult to make because of its short length and hardness of material to be made of. Furthermore, once the U-shaped wire 15 is inserted into the upper/lower holes 131/141, it is difficult to be pulled out which results in inconvenience in re-arranging the switch 13 and the socket 14.

The present invention intends to provide an improved panel which has an extending live line and an extending ground line both of which are respectively and electrically connected to a corresponding mains live or ground line, each of the switches and the sockets disposed to the panel have two engaging means to electrically engage to the live line and the ground line respectively so as to mitigate and/or obviate the above-mentioned problems.

SUMMARY OF THE INVENTION

The present invention provides a construction of a panel which includes at least one opening defined therein, a first and a second box are respectively disposed beside the opening of the panel, each of the first and second boxes has a hole defined therein and an extending live line and an extending ground line respectively extend from the first box and the second box and extend along sides defining the opening and one end of the extending live/ground line is in communication with the corresponding holes of the first and the second boxes. The extending live line and the extending ground line are respectively and electrically connected to an electrical element, such as a switch or a socket, disposed within the opening of the panel, which has two conductive engaging means to engage to the extending live line and the extending ground line respectively.

It is an object of the present invention to provide a construction of a panel which has an extending live line and an extending ground line disposed thereto such that the switch and/or the socket are engaged instantly to the live/ground line when installed.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
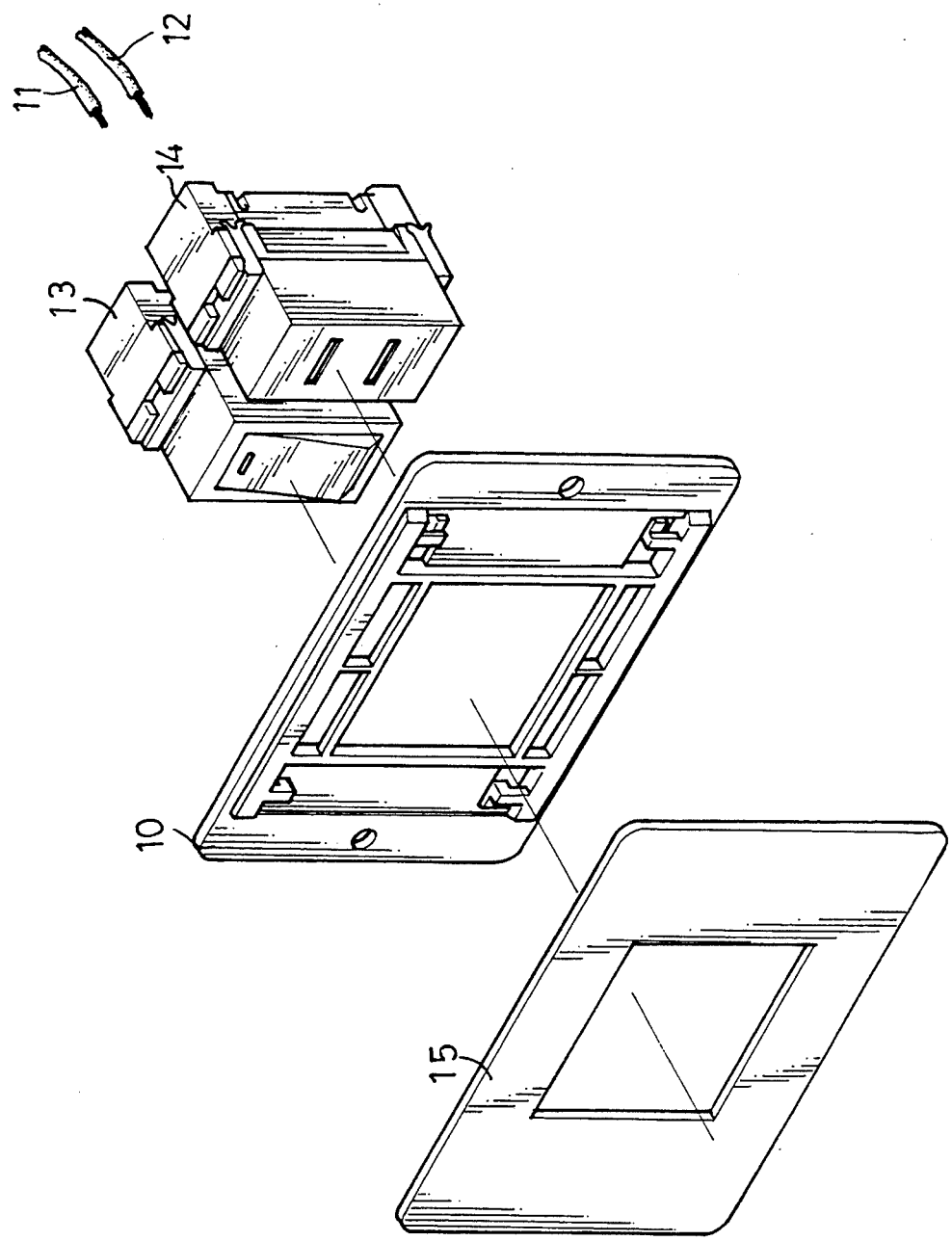
FIG. 1 is an exploded view of a conventional panel and a switch and two sockets.
Figure 2:
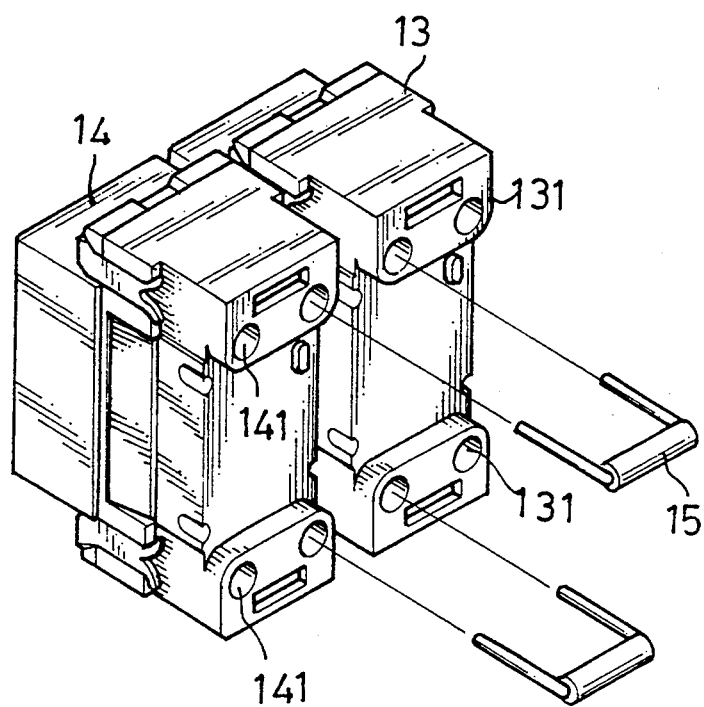
FIG. 2 is an exploded view of two conventional sockets or switches and two U-shaped wires.
Figure 3:
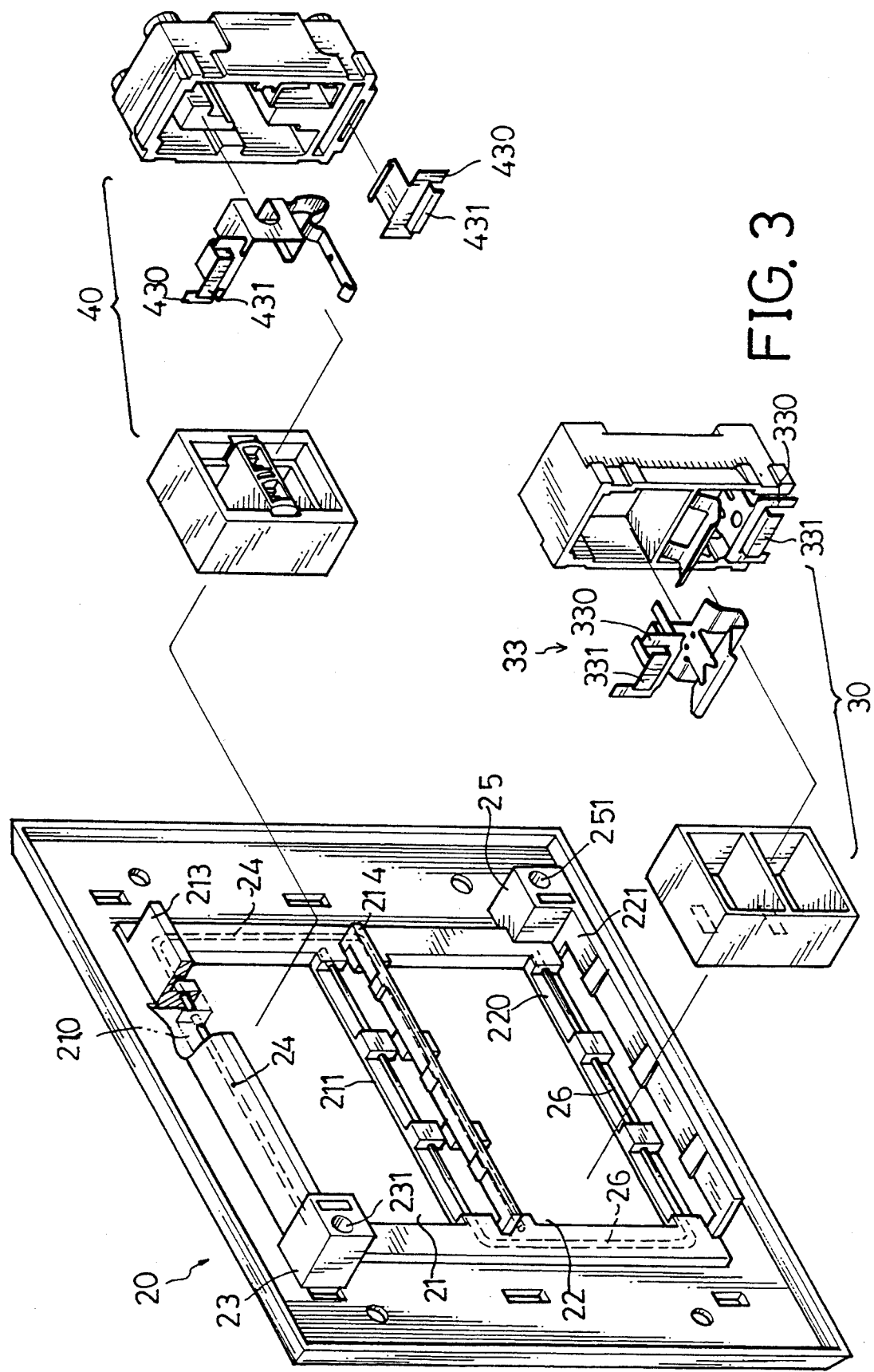
FIG. 3 is an exploded view of a panel, a switch and a socket in accordance with the present invention.
Figure 4:
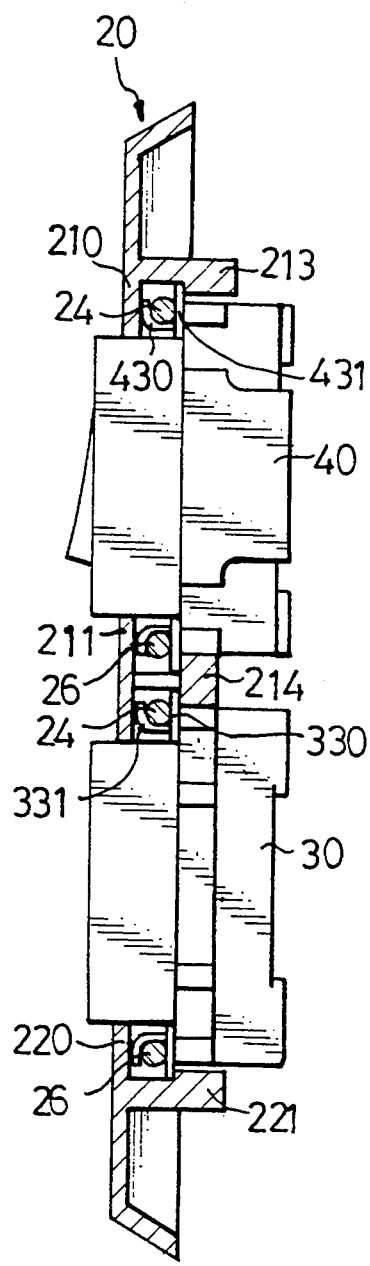
FIG. 4 is a side elevational view, partly in section, of the panel and the switch and the socket in accordance with the present invention.

Referring to FIGS. 3 and 4, a panel 20 in accordance with the present invention generally is a substantially rectangular plate which has two openings 21, 22 divided by a middle plate 211, that is, the opening 21 is defined by two vertical sides, an upper plate 210 and the middle plate 211 and the opening 22 is defined by two vertical sides, the middle plate 211 and a lower plate 220. The panel 20 has a front side and a rear side which faces to the wall (figures not shown). The panel 20 has a first plate 213, a second plate 214 and a third plate 221 which respectively extend transversely toward to the rear side thereof wherein the first plate 213 corresponds to the upper plate 210, the second plate 214 corresponds to the middle plate 211 and the third plate 221 corresponds to the lower plate 220. Electrical elements, such as a socket 30 and a switch 40, are disposed within the openings 21, 22 of the panel 20 in a conventional way by which the electrical elements are securely engaged between the first and the second plates 213, 214 and/or the second plate 214 and the third plate 221. A first box 23 and a second box 25 are disposed to the rear side of the panel 20 wherein the first box 23 is located beside an upper left corner of the opening 21 and the second box 25 is located beside a lower right corner of the opening 22. Each of the first and second boxes 23, 25 has a hole 231/251 defined therein for a mains live line and a mains ground line (figures not shown) to be inserted therein respectively. An extending live line 24 extends from the first box 23 and extends through the upper plate 210, the vertical side of the opening 21 and a lower side of the middle plate 211, wherein the upper plate 210 and the middle plate 211 have a plurality of cut-aways defined therein where the extending live line 24 passing therethrough is exposed. An extending ground line 26 extends from the second box 25 and extends through the lower plate 220, the vertical side thereof and an upper side of the middle plate 211, wherein the lower plate 220 and the middle plate 211 have a plurality of cut-aways defined therein where the extending ground line 26 is exposed. One end of the extending live line 24 is in communication with the hole 231 of the first box 23 and one end of the extending ground line 26 is in communication with the hole 251 of the second box 25, such that the extending live/ground line 24/26 is electrically connected to the mains live/ground line (figures not shown) when the mains live/ground line is inserted into the hole 231/251.

Each socket 30 has at least two receiving plates 33 which have a similar structure as the conventional one for a purpose of secure engagement with a plug (figures not shown), each receiving plate 33 has two separated conductive plates 330 extending upwardly therefrom and an L-shaped plate 331 extending transversely between each pair of conductive plates 330 so as to receive the exposed extending live/ground 24/26 lines between the L-shaped plate 331 and the plates 330. The two conductive plates 330 and the L-shaped plate 331 extend from an upper end and a lower end of the socket 30 such that when the socket 30 is disposed between the first and the second plates 213, 214 corresponding to the opening 21 or between the second and the third plates 214, 221 corresponding to the opening 22 the two pairs of plates 330 and L-shaped plate 331 thereof are respectively engaged to the exposed extending live line 24 and the extending ground line 26 and therefore, the present invention eliminates a process of making the U-shaped wire as mentioned above. The switch 40 also has two pair of the conductive plates 430 and each pair of the conductive plates 430 has an L-shaped plate 431 transversely extending therebetween and extending from an upper end and a lower end thereof respectively to engage to the exposed extending live line 24 and the extending ground line 26 respectively.

Accordingly, the present invention provides an improved panel 20 having a feature of having the extending live and ground lines 24, 26 disposed thereto such that the socket 30 and the switch 40 are electrically connected instantly to the live and ground lines when they are installed.

Although the invention has been explained in relation to its preferred embodiment, it is to be understood that many other possible modifications and variations can be made without departing from the spirit and scope of the invention as hereinafter claimed.

I claim

1. A construct of a panel comprising:
    at least one opening defined in said panel, at least one electrical element being disposed within said opening;
    a first box disposed beside said opening of said panel, a first hole defined in said first box for a live line inserted therein, an extending live line extending from said first box and extending along sides defining said opening and, one end of said extending live line communicated with said first hole; and
    a second box disposed beside said opening of said panel, a second hole defined in said second box for a ground line inserted therein, the ground line extending from said second box and extending along sides defining said opening, one end of said extending ground line communicated with said second hole such that said electrical element is electrically connected to said extending live and extending ground lines respectively.

2. The panel as claimed in claim 1 wherein said electrical element has at least two engaging means disposed therein for electrical connection to said extending live/ground lines, said engaging means has a conductive plate extending upwardly therefrom and an L-shaped plate extending transversely from said conductive plate so as to receive said extending live/ground line between said L-shaped plate and said conductive plate.

* * * * *